United States Patent [19]
Yamamoto et al.

[11] Patent Number: 5,419,595
[45] Date of Patent: May 30, 1995

[54] THREADED JOINT FOR OIL WELL PIPES

[75] Inventors: Miyuki Yamamoto, Ikeda; Shigeo Nagasaku, Nishinomiya, both of Japan

[73] Assignee: Sumitomo Metal Industries, Ltd., Osaka, Japan

[21] Appl. No.: 310,110

[22] Filed: Apr. 23, 1994

[51] Int. Cl.6 .................................................. F16L 35/00
[52] U.S. Cl. ..................................... 285/334; 285/390
[58] Field of Search ................. 285/333, 334, 355, 390

[56] References Cited

U.S. PATENT DOCUMENTS 5,007,665  4/1991  Bovisio et al. ...................... 285/334
5,360,239  11/1994  Klementich ...................... 285/334 X

FOREIGN PATENT DOCUMENTS 810082  4/1969  Canada ................................ 285/334
0104720  4/1984  European Pat. Off. ............ 285/334

Primary Examiner—Randolph A. Reese
Assistant Examiner—Heather Chun
Attorney, Agent, or Firm—Burns, Doane, Swecker & Mathis

[57] ABSTRACT

A threaded joint for oil well pipes has excellent leak-tightness and a high disconnect torque and can withstand repeated make-ups. At the time of make-up, the load flanks (1) of the male and female threads contact each other, either the crest surfaces (3) or the root surfaces (4) are contacting and the other of the two pairs of surfaces has a gap, and a gap of at most 0.03 mm exists between the stab flanks (2) of the male and female threads.

3 Claims, 6 Drawing Sheets

BOX (FEMALE THREAD)

PIN (MALE THREAD)

BOX (FEMALE THREAD)

PIN (MALE THREAD)

THREADED JOINT FOR OIL WELL PIPES

BACKGROUND OF THE INVENTION

This invention relates to threaded joints for oil well pipes used for the exploration and production of natural gas and crude oil beneath the ground, and particularly to a joint suitable for use in deep wells and in severe corrosive environments.

Today, threaded joints are widely used as a means for connecting oil well pipes used in the exploration and production of natural gas fields and crude oil fields, which may be at a depth of thousands of meters. Threaded joints for oil well pipes include integral types, in which a pin formed on one end of a tube is connected to a box formed on one end of another tube, and coupling types in which a coupling having a box formed on each end is used to connect pipes having pins formed on both ends.

Oil well pipes are installed beneath the ground in wells and are used under high pressures and high loads and is bad environments. Therefore, various capabilities are demanded of such threaded joints, including (1) that they be able to withstand axial tensile forces due to the weight of the pipes to which they are connected, (2) that they be able to withstand the internal pressure from fluids inside them, (3) that they do not corrode due to the fluids inside them, and (4) that they be capable of being reused dozens of times. In recent years, wells have tended to become deeper, so the above requirements have been become more stringent.

There have been many proposals for threaded joints for oil well pipes which can satisfy such demands.

FIG. 7(a) is a cross-sectional view showing two pipes 10 connected together by a coupling 20, and FIG. 7(b) is an enlarged view of a portion of FIG. 7(a). A seal is formed by contacting a tapered, seal-forming unthreaded portion 13 on the end of an externally-threaded pin 11 formed on the end of each pipe 10 and a tapered seal-forming unthreaded portion 23 on the inside of an internally-threaded box 21 formed on the inside of the coupling 20. 12 indicates a male thread portion and 22 indicates a female threaded portion. By forming a metal-to-metal seal in this portion, the leak-tightness against the internal pressure of fluids within the oil well pipes is increased.

An unthreaded portion 14 formed on the end of unthreaded portion 13 of the pin 11 is abutted against an unthreaded portion 24 formed inside of unthreaded portion 23 of the box 21 to form a torque shoulder. Due to the abutment between these portions, the make-up torque is adjusted to a suitable value so that a high contact surface pressure producing excessive plastic deformation is not generated.

Many proposals have been made for the shapes of the threads used in these joints, such as those described below.

The buttress threads shown in FIGS. 2(a) and 2(b) are prescribed by Standard 5B of the API (American Petroleum Institute). FIG. 2(a) shows the shape of the buttress threads, and FIG. 2(b) shows the state of contact between the male threads and female threads at the time of make-up. In FIGS. 2(a) and 2(b), the upper portion corresponds to an internally-threaded box portion 21 and the lower portion corresponds to an externally-threaded pin portion 11. Due to the threaded engagement during make-up, load flanks 1 are formed by a male load flank 1a and a female load flank 1b, stab flanks 2 are formed by a male stab flank 2a and a female stab flank 2b, crest surfaces 3 are formed by a male crest surface 3a and a female crest surface 3b, and root surfaces 4 are formed by a male root surface 4a and a female root surface 4b.

FIG. 1 illustrates the contact between the thread surfaces in a threaded joint according to this invention. It shows the load flank angle $\alpha$ and the stab flank angle $\theta$ of a buttress thread which influence the performance of a threaded joint. The flank angle is a positive or negative angle measured with respect to line X-Y or X'-Y' extending perpendicular to an unillustrated pipe axis. The load flank angle $\alpha$ is a negative angle measured in the counterclockwise direction, and the stab flank angle $\theta$ is a positive angle measured in the counterclockwise direction.

An API buttress thread has a load flank angle of 3 degrees and a stab flank angle of 10 degrees. As shown in FIG. 2(b), at the time of make-up, there is thread contact along the load flanks 1, no contact along the stab flanks 2, and contact along at least one of the crest surfaces 3 and the root surfaces 4. The dimensional tolerances for API standards allow a gap of from 0.03 to 0.19 mm between the stab flanks 2.

There also exists a thread shape referred to as an improved buttress thread, as shown in FIG. 3(a). This thread has a load flank angle of 0 degrees and a stab flank angle of 45 degrees. As shown in FIG. 3(b), at the time of make-up, there is contact along the load flanks 1 and the stab flanks 2, and gaps exist along the crest surfaces 3 and the root surfaces 4. In FIG. 3(b), the same parts as in FIG. 2(b) are indicated by the same reference numerals.

Threaded joints using the above-described thread shapes have the following problems.

Although the frequency of occurrence is not high, there are cases in which a compressive force acts in the axial direction of pipes. When a tensile load is subsequently applied due to the weight of the pipes, the contact surface pressure in the seal portion and the torque shoulder of the API buttress thread of FIG. 2 decreases, and in extreme cases, a gap develops. This phenomenon decreases the leak-tightness with respect to fluids within the pipes, and permits the internal fluids to easily leak and penetrate into the gaps, and a great deal of corrosion occurs in the gaps.

Furthermore, when this phenomenon is occurring, if for some reason a torque acts on the joint in the loosening direction, the joint can easily become disconnected, and there is the danger of the oil well pipes falling into the well. In this case, it is extremely difficult to reconnect the oil well pipes within the well, and in the worst case, it is necessary to abandon an oil well which is in the development stage or the production stage. This problem becomes more severe as the depth of a well increases, because the tensile forces due to the weight of the pipes increase. These phenomena occur due to there being a relatively wide gap at the stab flanks at the time of make-up, so when a compressive force is applied, the threads are not subjected to the compressive load until this gap disappears, and compressive loads concentrate in the seal portion and torque shoulder. In these portions, large plastic deformation develops. Therefore, when tensile forces subsequently act, the contact surface pressure in these portions is no longer the same as that before deformation and greatly decreases, and the maintaining torque of the joint decreases.

In the improved buttress thread shown in FIG. 3, there are cases in which the thread surfaces are damaged by as few as 10 repeated make-ups. This damage is not severe enough to be described as seizure, but abrasion damage is evident. The cause of this damage is that both the load flanks and the stab flanks are in a contacting state at the time of make-up. By increasing the flank angle of the stab flanks, the contact surface pressure at the stab flanks can be significantly decreased, but the contact surface pressure is still high. Accordingly, if the joint undergoes further continuous use, there is the danger of seizure developing with this damage as a starting point. In order to avoid this danger, it is necessary to machine the threads to modify their shape, which leads to the increased costs.

SUMMARY OF THE INVENTION

The object of the present invention is to provide a threaded joint which has excellent leak-tightness with respect to the internal fluids within oil well pipes even after a compressive load, which has a high disconnect torque, i.e., when for some reason a torque in the loosening direction acts on the threaded joint, it maintains a torque which resists this force, and which prevents damage to the thread surfaces caused by repeated make-ups.

The present invention resides in the below-described threaded joint for oil well pipes. Namely, it is a threaded joint for oil well pipes of the type having a seal portion formed by a seal-forming unthreaded portion on the end of a pin having a buttress-shaped male thread and a seal-forming unthreaded portion on a box having a buttress-shaped female thread, and a torque shoulder formed by abutting a torque shoulder-forming unthreaded portion on the end of the pin and a torque shoulder-forming unthreaded portion on the box, characterized in that, as shown in FIG. 1, at make-up, the load flanks 1 of the male and female threads are contacting, either the crest surfaces 3 or the root surfaces 4 are contacting and the other of these two pairs of surfaces has a gap, and a gap of at most 0.03 mm is formed between the stab flanks 2 of the male and female threads, whereby excellent leak-tightness and an excellent disconnect torque are obtained, and the joint can withstand repeated use.

Contact between one surface and another surface means that they are in touch with each other under a contacting pressure. The presence of a gap between one surface and another surface means that they are not contacting each other.

DETAILED DESCRIPTION OF PREFERRED EMBODIMENTS

The present inventors performed in-depth research of the behavior of threaded joints when a compressive force is applied as well as of damage to thread surfaces when a threaded joint is subjected to repeated make-ups, and they made the following discoveries.

1) At the completion of the make-up of threads, if there is a gap between the stab flanks of the threads, when a compressive force is applied, the male thread and the female thread move with respect to each other in the axial direction, and until the gap disappears, the threads are not subject to the compressive load. For this reason, most of the compressive load is concentrated on the seal portion and the torque shoulder, and large plastic deformation occurs in these portions. Thereafter, when a tensile load is applied by the weight of the oil well pipes, the male and female threads move in opposite directions, and a gap again forms between the stab flanks of the threads. At this time, due to the plastic deformation of the seal portion and the torque shoulder, the contacting surface pressure decreases, and in the worst case, a gap develops.

2) In order to prevent this phenomenon, it is possible to provide contact between the stab flanks of the threads during make-up, but the surface pressure on the thread surfaces becomes large, and compared to the case in which there is a gap between the stab flanks of the threads, it is easy for the thread surfaces to be damaged.

Based on the above knowledge, the conditions at the time of make-up according to the present invention are set as follows.

Figure 1:
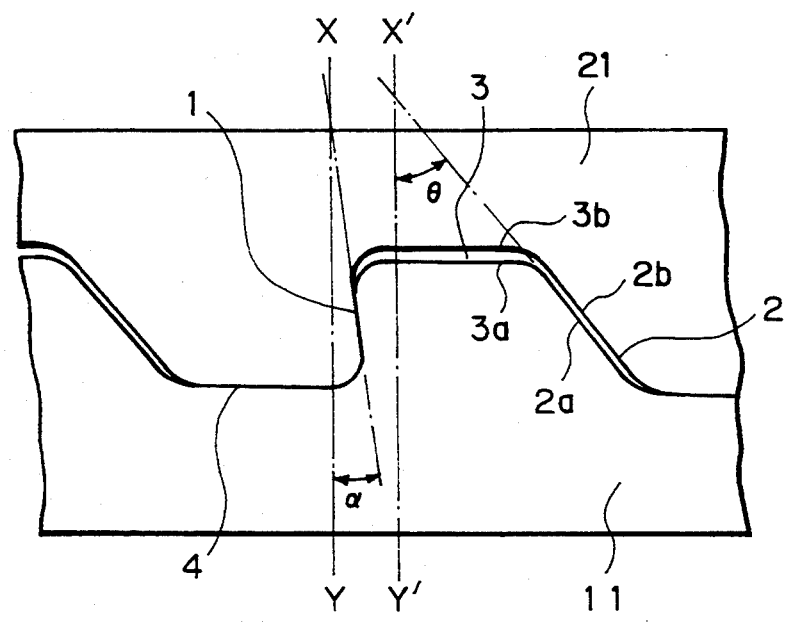
FIG. 1 is a view of the thread shape of a threaded joint according to this invention and the thread surface contact state at the time of make-up.
Figure 2A:
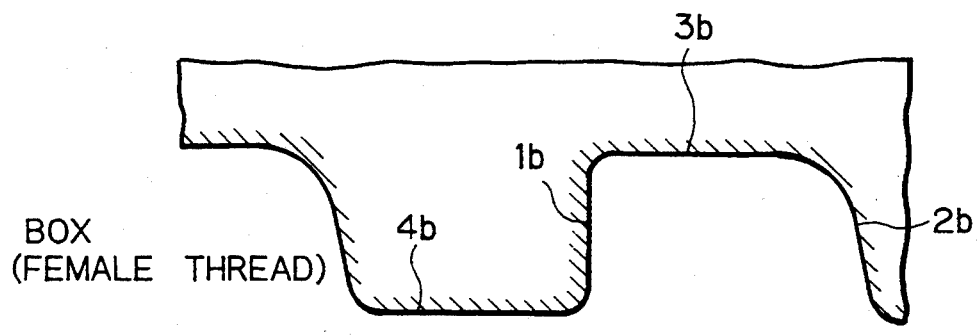
FIG. 2(a) is a longitudinal cross-sectional view showing the shape of an API standard buttress thread.
Figure 2A:
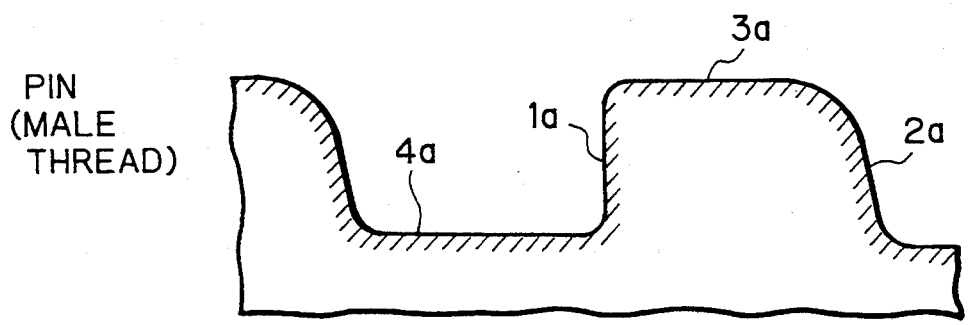
Figure 2B:
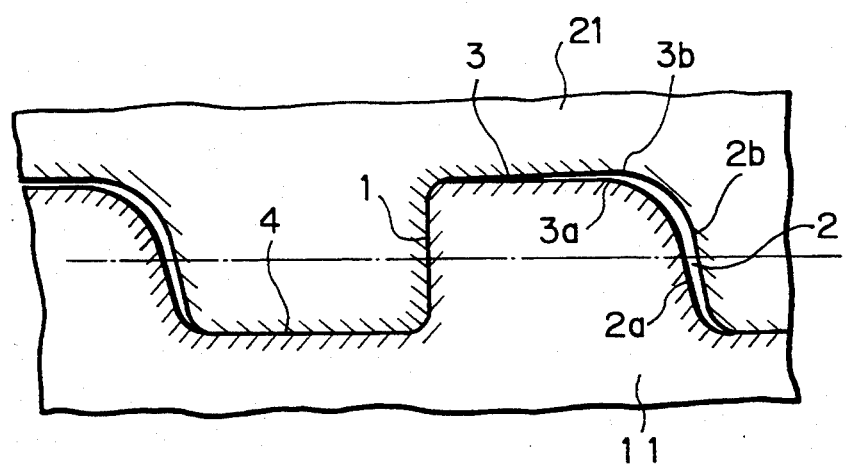
FIG. 2(b) is a longitudinal cross-sectional view showing the state of surface contact of the threads at the time of make-up.
Figure 3A:
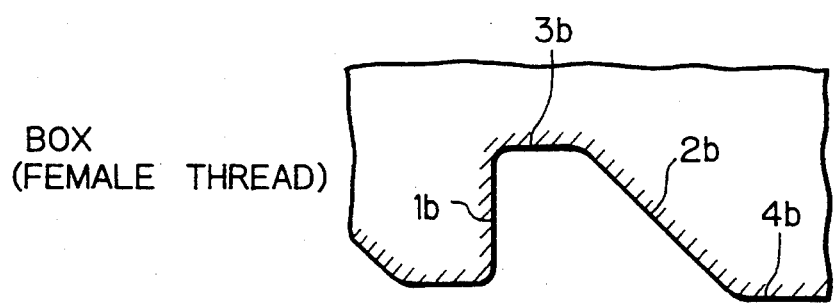
FIG. 3(a) is a longitudinal cross-sectional view showing the shape of an improved buttress thread.
Figure 3A:
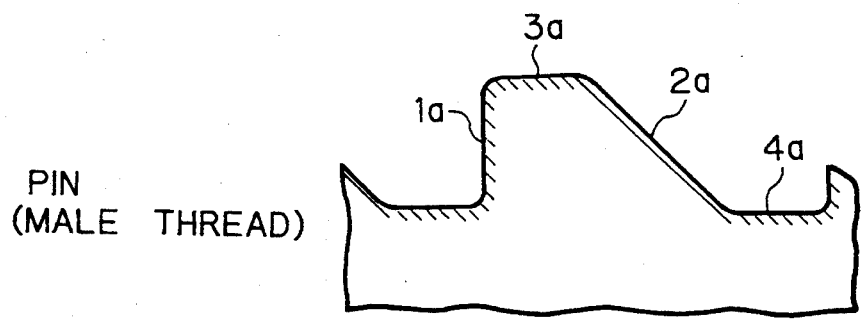
Figure 3B:
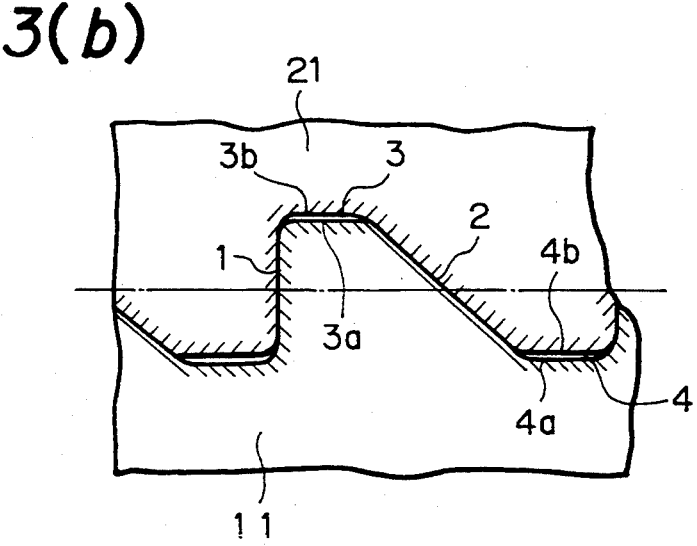
FIG. 3(b) is a longitudinal cross-sectional view showing the state of surface contact of the threads at the time of make-up.

As shown in FIG. 1, the threads of a threaded joint according to this invention can be classified as so-called buttress threads. With this shape, compared to a triangular thread, the ratio of the thread pitch to the thread height can be decreased, and the joint efficiency (the critical cross-sectional area of the joint divided by the cross-sectional area of the pipe body) can be correspondingly increased.

A buttress thread has four thread surfaces, i.e., a load flank 1, a stab flank 2, a crest surface 3, and a root surface 4. In a joint having a torque shoulder, in order to apportion the reaction force accompanying contact with the torque shoulder to the load flanks 1, the load flanks 1 are made to be always contacting. In order to stabilize the engagement of the threads, it is necessary for those to be contact along at least one of the other three surfaces. In a threaded joint according to this invention, either the crest surfaces 3 or the root surface 4 are contacting, and the stab flanks 2 are made non-contacting, i.e., a gap is provided between them.

Either the crest surfaces 3 or the root surfaces 4 are made contacting because contact along such thread surfaces is favorable for preventing damage to the thread surfaces. Namely, when the load flanks 1 are contacting and either the crest surfaces 3 or the root surfaces 4 are contacting, the surface pressure generated at the crest surfaces 3 or the root surfaces 4 is smaller than the contact surface pressure generated at the stab flanks 2 by contact between the stab flanks 2. This is because the direction of action of the surface pressure is nearly in the radial direction of the pipe on the crest surfaces 3 or the root surfaces 4, and it is nearly in the axial direction of the pipe along the stab flanks 2. The pipe can relatively easily deform in the radial direction, so the surface pressure in this direction does not become so large, but in the axial direction, adjoining threads are restrained (the surface pressure on the load flanks 1 is nearly in the axial direction of the pipe, and it opposes the surface pressure on the stab flanks 2), so the surface pressure in this direction becomes large.

At the same time, in the threaded joint of this invention, a gap is provided between either the crest surfaces 3 or the root surfaces 4. Grease or other lubricant used at the time of joint make-up penetrates into this gap, and it prevents damage to the thread surfaces with greater certainty, and at the same time, air which is trapped during make-up by contact between the seal portion of the pin and the box can escape to the outside through this gap. Namely, this gap has a spiral shape communicating with the outside, so it is possible for trapped air to escape to outside the pipe. For these purposes, in a preferred embodiment, the gap is 0.1 mm or more.

One of the characteristics of a threaded joint according to this invention is that the stab flanks 2 are non-contacting. The gap between the male thread stab flank 2a and the female thread stab flank 2b is made at most 0.03 mm. The reason why this gap is set to a small value is so that when a compressive force acts on the joint, the plastic deformation of the seal portion and the torque shoulder is decreased. As a result, even if a tensile force is subsequently applied, there is almost no decrease in the surface pressure in the seal portion and the torque shoulder. Furthermore, the maximum value of the gap is made 0.03 mm in order to adequately maintain the disconnect torque of the threaded joint.

The load flank angle ($\alpha$) influences the tensile strength of a joint. Namely, a tensile load applied to the joint is received on the thread load flanks to increase the pressure between the load flanks. The total force F acting on the load flanks can be illustrated as in FIG. 4, from which it is apparent that the force F can be divided into an axial component $F\cos\alpha$ and a radial component $F\sin\alpha$. The total force F is given by integration of an increment of contact pressure over an contact area. When the load flank angle ($\alpha$) is positive, the radial component $F\sin\alpha$ acts in a direction to separate a pin and box. The absolute value thereof increases as $\alpha$ increases. For this reason, when $\alpha$ is large, the pin and box are easily separated by a relatively small force. Namely, the threads lose their engagement with each other, and the pin is withdrawn from the box. This phenomenon is called "jump-out". Thus, according to a preferred embodiment of the present invention, the load flank angle ($\alpha$) is 10 degrees or smaller.

Figure 4:
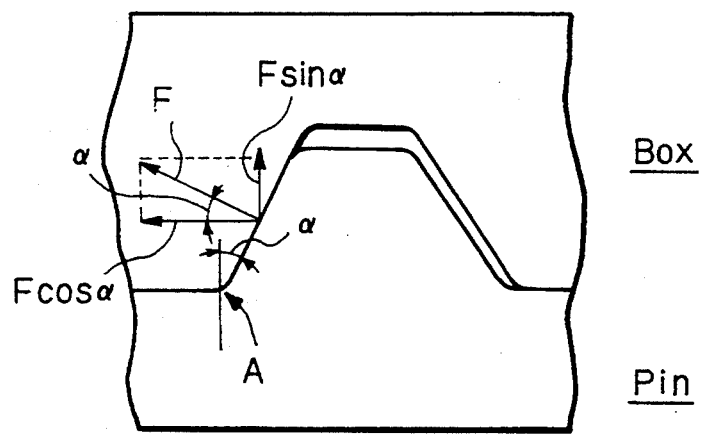
FIG. 4 is an illustration of a load flank angle $\alpha$.

In order to completely prevent "jump-out", it is advisable to restrict the load flank angle $\alpha$ to smaller than 0 degrees. However, when the angle $\alpha$ has a large negative value, a root portion of the load flank as indicated by "A" in FIG. 4, is subjected to a high stress when a tensile force is applied to the joint, resulting in marked plastic deformation. Therefore, it is advisable that the angle $\alpha$ be restricted to not smaller than $-10$ degrees, i.e., an absolute value of at most 10 degrees.

When the angle is between zero (inclusive) and $+10$ degrees (inclusive), the ultimate tensile force at which jump-out occurs is increased, but jump-out cannot be suppressed thoroughly.

Figure 5:
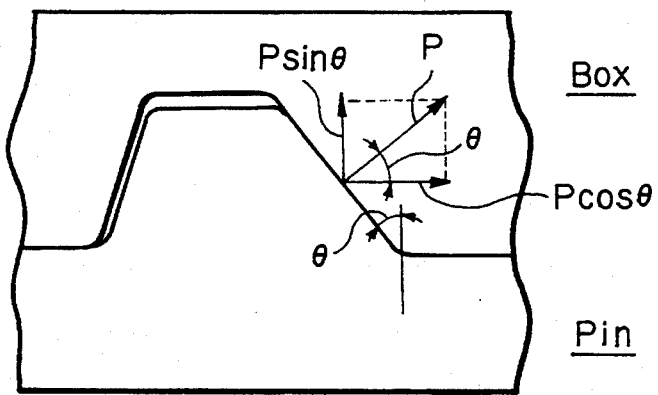
FIG. 5 is an illustration of a stab flank angle $\theta$.

The stab flank angle ($\theta$) influences the compressive strength of a joint. Namely, a compressive load applied to the joint is received on the thread stab flanks of a pin and box to increase the contact pressure between the stab flanks. Provided that an increment, i.e., increase inn each of the stab flanks is combined to make the total force P, the total force P can be illustrated as in FIG. 5 from, which it is apparent that the force P can be divided into an axial component $P\cos\theta$ and a radial component $P\sin\theta$. The axial component $P\cos\theta$ corresponds to a compressive force applied from the outside. As the stab flank angle ($\theta$) increases, the axial component $P\cos\theta$ increases, and the capacity of the stab flank to receive compressive loads also increases. For this purpose, the stab flank angle ($\theta$) is preferably adjusted to be 45 degrees or less.

On the other hand, when the stab flank angle $\theta$ is small, it is difficult to establish an accurate alignment of a pin and box, resulting in degradation in so-called "stabbing" properties at the time of make-up. For this reason, the stab flank angle $\theta$ is preferably restricted to 10 degrees or larger.

Figure 6:
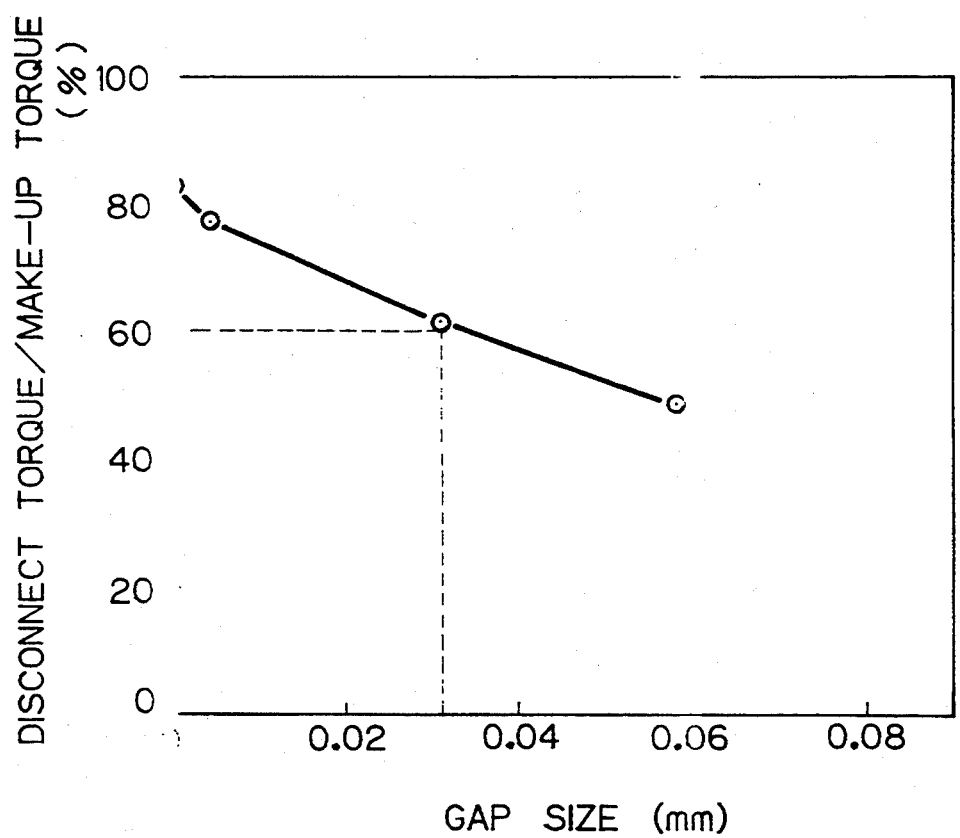
FIG. 6 is a graph showing the effect of a gap along the stab flanks on the variation in disconnect torque due to a compressive load.
Figure 7A:
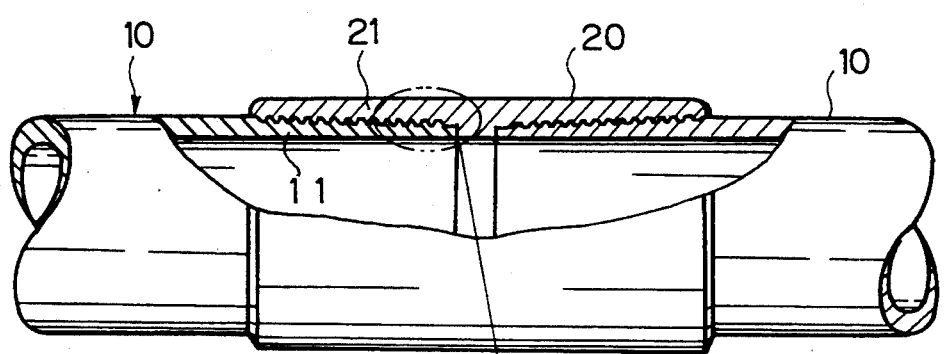
FIG. 7a and FIG. 7b are longitudinal cross-sectional views showing the basic structure of a coupling-type threaded joint for oil well pipes.
Figure 7B:
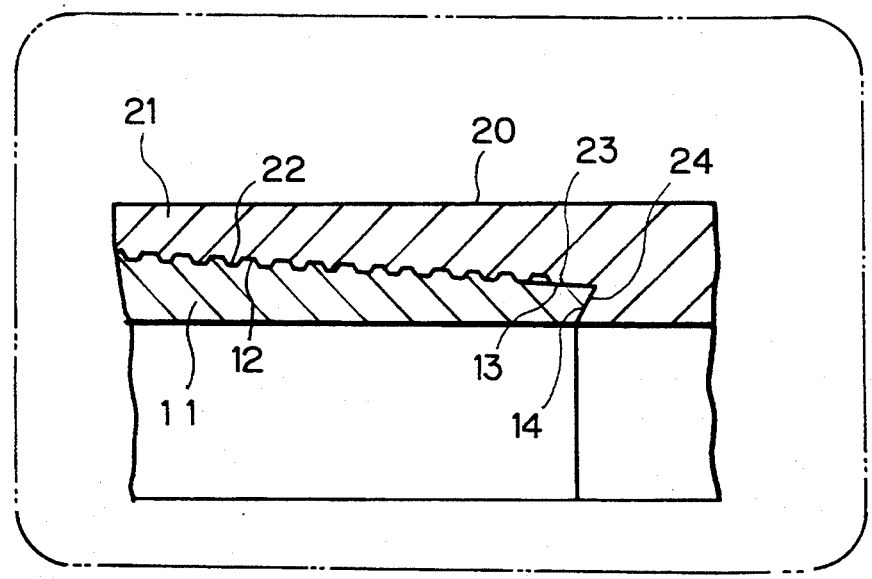

FIG. 6 shows how the ratio of the disconnect torque to the make-up torque of the threaded joint varies as a function of the gap size after axial compressive force is applied to the pipe body to produce a stress corresponding to 50% of the yield strength. The threaded joint which was employed had the same dimensions as in the examples described below. The make-up torque was the torque required to connect and secure the threaded joint.

From this figure, it can be seen that as the gap at the stab flanks increases, the ratio of the disconnect torque to the make-up torque monotonically decreases, and in order to guarantee a disconnect torque of at least 60% of the make-up torque, it is necessary for the gap at the stab flanks to be at most 0.03 mm. The reason for maintaining the disconnect torque to be at least 60% of the make-up torque is so that even if a twisting torque in the loosening direction acts on the joint during use of oil well pipes, the joint is not easily loosened and is prevented from falling into a well.

By setting the thread engagement conditions during make-up as described above, even if a tensile force caused by the weight of pipes is applied after a compressive force is applied, there is almost no decrease in the surface pressure in the seal portion, the leak-tightness of the inside of the pipe can be maintained, the disconnect torque of the joint undergoes almost no decrease, and the danger of the pipe falling into the well can be avoided.

A joint according to the present invention can be either a coupling type joint or an integral joint. The above-described advantages are the same with either type.

EXAMPLES

Below, the capabilities of a threaded joint according to this invention will be described by way of examples. A coupling-type joint like that shown in FIG. 5 was manufactured while varying the thread characteristics as shown in Table 1. The other characteristics of the threaded joint were as follows.

outer diameter of pipe: 177.8 mm
wall thickness of pipe: 10.36 mm outer diameter of coupling: 194.5 mm material of pipe and coupling: API Standards L80 (yield strength=56.3 kgf/mm$^2$)
thread shape: buttress thread
thread pitch: 5.08 mm
thread taper: 1/16
thread height: 1.575 mm

TABLE 1

| Joint No. | Load Flank Angle (°) | Stab Flank Angle (°) | Contact State of Thread Surfaces* | Comments |
|---|---|---|---|---|
| This Invention | | | | |
| A | 3 | 10 | (a) (0.02 mm) | |
| B | −3 | 20 | (a) (0.03 mm) | |
| C | 0 | 45 | (a) (0.02 mm) | |
| D | 10 | 10 | (a) (0.03 mm) | |
| E | −10 | 45 | (a) (0.03 mm) | |
| Comparative Examples | | | | |
| F | 3 | 10 | (a) (0.10 mm)** | API Standard thread |
| G | 0 | 45 | (b)** | Improved buttress thread |
| H | 3 | 10 | (b)** | |
| I | 0 | 45 | (a) (0.05 mm)** | |

Notes:
*(a) Contact along load flanks and root surfaces, no contact along stab flanks and crest surfaces.
-Numbers in parentheses are the gap size along stab flanks.
(b) Contact along load flanks and stab flanks.
**outside the range of this invention.

These threaded joints were subjected to a repeated make-up test and to a combined load test to evaluate their performance. In the repeated make-up test, lubricating grease was applied to the threads, make-up and disconnection of the joint were repeated, and damage to the thread surfaces was investigated. The maximum number of repetitions was 20 times. In the combined load test, the joint was made up, an axial compressive force corresponding to 50% of the yield strength was applied to the pipe body, and then an axial tensile force equivalent to 80% of the yield strength was applied to the pipe body together with an internal pressure (according to API standards) of 80% of the yield strength, and leaks of internal pressure were investigated. The results of the above tests are shown in Table 2.

TABLE 2

| Joint No. | Repeated Make-Up Test | Combined Load Test |
|---|---|---|
| This Invention | | |
| A | 20 repetitions- No abnormalities | No leaks |
| B | 20 repetitions- No abnormalities | No leaks |
| C | 20 repetitions- No abnormalities | No leaks |
| D | 20 repetitions- No abnormalities | No leaks |
| E | 20 repetitions- No abnormalities | No leaks |
| Comparative Examples | | |
| F | 20 repetitions- No abnormalities | Leak developed |
| G | Friction damage at 9th repetition, seizure at 14th repetition | No leaks |
| H | Friction damage at 1st repetition, seizure at 3rd repetition | No leaks |
| I | 20 repetitions- No abnormalities | Leak developed |

From Table 2, it can be seen that for the Comparative Examples, a problem occurred in one or the other of the tests, but for the joint according to the present invention, good results were obtained in both tests.

In this example, the results for a coupling-type joint was described, but similar effects were obtained with an integral type.

As is apparent from the foregoing, a threaded joint for oil well pipes according to the present invention has excellent leak-tightness and can maintain a high disconnect torque even after a compressive load, it can withstand several tens of times of repeated make-ups and disconnections, and it can be economically used in wells which are becoming increasingly deeper.

What is claimed is:

1. A threaded joint for oil well pipes of the type having a seal portion formed by a seal-forming unthreaded portion on the end of a pin having a buttress-shaped male thread and a seal-forming unthreaded portion on a box having a buttress-shaped female thread, and a torque shoulder formed by abutting a torque shoulder-forming unthreaded portion on the end of the pin and a torque shoulder-forming unthreaded portion on the box, characterized in that at the time of make-up, the load flanks of the male and female threads are contacting, either the crest surfaces or the root surfaces are contacting and the other of these two pairs of surfaces has a gap, and a gap of at most 0.03 mm is formed between the stab flanks of the male and female threads.

2. A threaded joint for oil well pipes as set forth in claim 1 wherein the load flank angle ($\alpha$) is not larger than 10 degrees and the stab flank angle ($\theta$) is 10–45 degrees.

3. A threaded joint for oil well pipes as set forth in claim 1 wherein the load flank angle ($\alpha$) is not smaller than −10 degrees but smaller than 0 degrees and the stab flank angle ($\theta$) is 10–45 degrees.

* * * * *

UNITED STATES PATENT AND TRADEMARK OFFICE
CERTIFICATE OF CORRECTION

PATENT NO. : 5,419,595
DATED : May 30, 1995
INVENTOR(S) : Miyuki YAMAMOTO et al

It is certified that error appears in the above-indentified patent and that said Letters Patent is hereby corrected as shown below:

Title Page:
In Section [22], delete "Apr. 23, 1994" and insert -- Sept. 23, 1994 --.

Signed and Sealed this

First Day of August, 1995

Attest:

BRUCE LEHMAN

Attesting Officer

Commissioner of Patents and Trademarks